Feb. 10, 1925.
J. CHRISTIE
LENS HOOD
Filed March 3, 1923
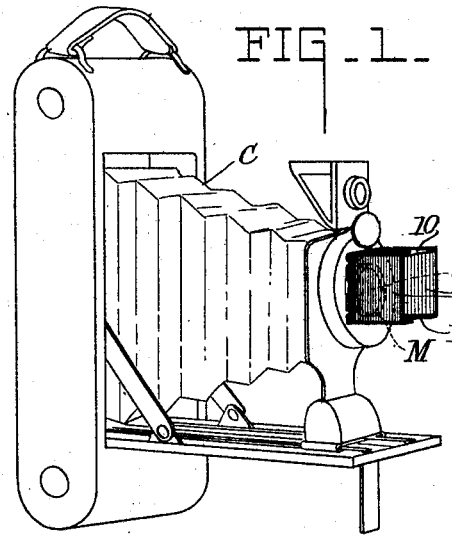
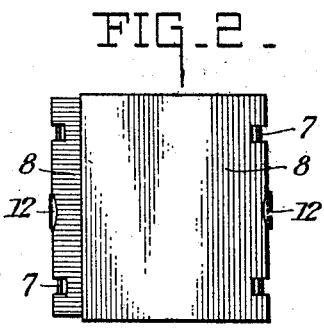
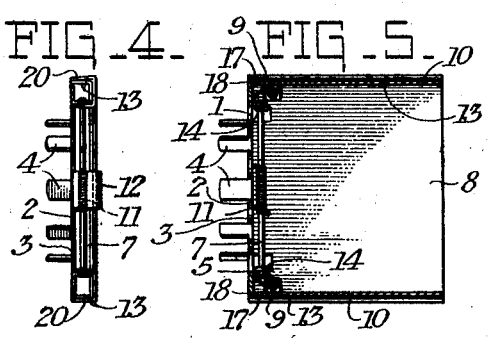
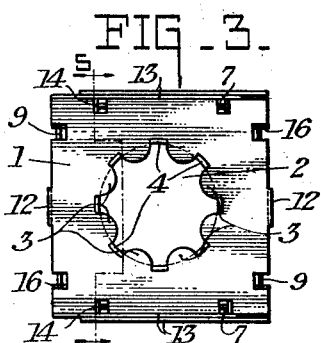
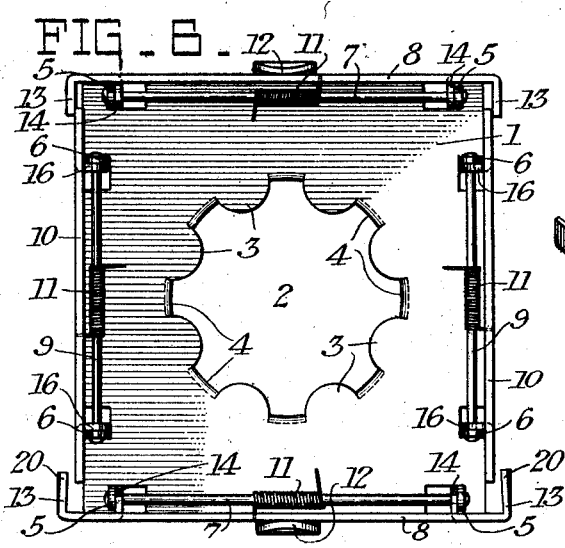
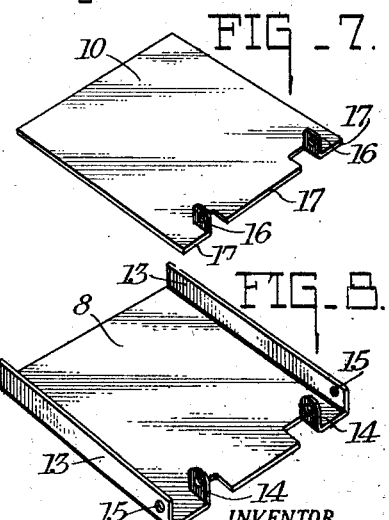
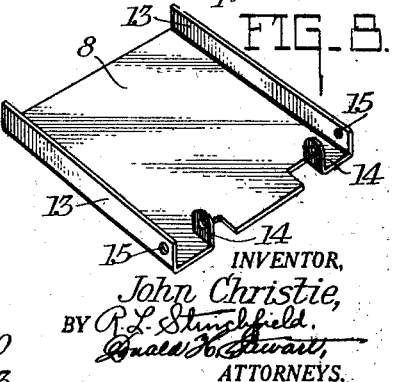
INVENTOR,
John Christie,
BY
ATTORNEYS.

Patented Feb. 10, 1925.

1,525,768

UNITED STATES PATENT OFFICE.

JOHN CHRISTIE, OF ROCHESTER, NEW YORK, ASSIGNOR TO EASTMAN KODAK COMPANY, OF ROCHESTER, NEW YORK, A CORPORATION OF NEW YORK.

LENS HOOD.

Application filed March 3, 1923. Serial No. 622,529.

*To all whom it may concern:*

Be it known that I, JOHN CHRISTIE, a citizen of the United States of America, residing at Rochester, in the county of Monroe and State of New York, have invented certain new and useful Improvements in Lens Hoods, of which the following is a full, clear, and exact specification.

This invention relates to photography and more particularly to lens hoods for shading a camera objective from light rays not used in taking the picture. One object of my invention is to provide a folding lens hood which may be left on the objective of a camera or which may be carried in the pocket; another object is to provide a lens hood which will be normally held open in position for use; another object is to provide an all metal hood of simple construction; another object is to provide a hood with a simple form of latch for holding the parts in a folded position; another object is to provide a one piece objective-engaging portion which will definitely locate the hood upon the lens barrel; and other objects will appear hereinafter from the following specification, the novel features being pointed out in the claims at the end thereof.

Fig. 1 is a perspective of a camera upon which there is mounted in operative position a lens hood constructed in accordance with and illustrating one embodiment of my invention;

Fig. 2 is a top plan view of the folded hood;

Fig. 3 is a bottom plan view of the same;

Fig. 4 is a side elevation of the hood;

Fig. 5 is a section on line 5—5 of Fig. 3;

Fig. 6 is an enlarged top plan of the hood open in position for use;

Fig. 7 is a perspective view of one of the sides; and

Fig. 8 is a perspective of another of the sides.

This lens hood consists of a base plate 1 centrally apertured at 2 to engage the lens mount M of an objective O of a camera C. The aperture is formed with a series of inwardly projecting lugs 3 which form a definite stop to limit the distance that the hood may be moved over the mount M. Mount engaging lugs 4 are bent at approximately right angles to lugs 3 and are for engaging the outside of mount M, and may be bent inwardly to engage different sizes of mounts as desired. It will be noted that the limiting lugs 3 and the engaging lugs 4 are formed from the single sheet of metal plate 1 constituting the base.

Extending up from base plate 1 are two series of lugs, 5 and 6, the two former series supporting hinge pintles 7 for the similar top and bottom plates 8, and the two latter series supporting hinge pintles 9 for the two similar side plates 10. These plates, 8 and 9, form a series of shielding plates for keeping undesirable light rays from entering the objective. Springs 11 encircle all of the pintles tending to turn all of the plates 8 and 10 to the open position shown in Fig. 1. Plate 1 also has formed on the top and bottom lugs 12 which serve as stops to limit the opening movement of plates 8.

Pintles 7 support top and bottom plates 8, each of which, as shown in Fig. 8, comprises a flat plate 8, having side flanges 13 and pintle engaging lugs 14. Apertures 15 are solely for assembling purposes. The flanges form an overlapping substantially light tight corner for the shielding plates when in an open position.

Pintles 9 support the side plate 10, each of which, as shown in Fig. 7, consists of a single sheet of material with formed up pintle lugs 16. These side plates, as will be seen from Fig. 5, are limited in their opening movement by the edges 17 of the plates coming into contact with the edges 18 of the base plate 1. Of course, the flanges 13 of plates 8 would also permit the springs 11 from opening the plates too great a distance to serve as a shade.

It will be noted from Figs. 3 and 6 that one set of flanges 13 are wider than the set on the other flanged plate 8, so that folding is permitted. Also as the flanges of the widest set of flanges are slightly bent inwardly at 20, they frictionally engage the opposite set and form a latch retaining the parts in a closed position (Fig. 4.). To open the hood flanges 13 are grasped at 30 and are then drawn out a short distance after which the parts spring into an open position.

In use the hood may be placed upon the camera objective and remain there, being folded before closing the camera, and opened before taking a picture. If desired, the hood can be carried separately, it being thin, can easily be contained in but little space.

As certain changes can be made from the illustrated hood without departing from the spirit of my invention, I wish to include all such forms as may come within the scope of the appended claims.

Having thus described my invention, what I claim as new and desire to secure by Letters Patent is:

1. A folding lens hood for cameras including a base having a plurality of edges, means on the base for attaching it to a lens barrel, a series of shielding plates hinged to the edges of the base movable to and from an open position, flanges carried by shielding plates for forming an overlapping joint between the edges of the shielding plates.

2. A folding lens hood for cameras including a base having a plurality of edges, means on the base for attaching it to a lens barrel, a series of shielding plates hinged to the edges of the base movable to and from an open position and springs tending to hold the shielding plates in the open position.

3. A folding lens hood for cameras including a base having a plurality of edges, means on the base for attaching it to a lens barrel, a series of shielding plates hinged to the edges of the base movable to and from an open position, springs tending to hold the shielding plates in an open position, and stops including the base plate for limiting the opening movement of the shielding plates.

4. A folding lens hood for cameras including a base having a plurality of edges, means on the base for attaching it to a lens barrel, a series of shielding plates hinged to the edges of the base movable to and from an open position, flanges carried by one shielding plate to frictionally engage portions of another shielding plate when the plates are moved from the open position to a folded position to latch the plates in folded positions.

5. In a folding lens hood for cameras, the combination with a base having a plurality of edges, of a series of shielding plates hinged to the edges of the base plate, and means on the base for attaching it to a lens barrel including two series of lugs, one series being angularly disposed with reference to the other series of lugs, whereby one will position the plate with respect to the lens barrel, and the other series will engage the lens barrel retaining the plate thereon.

6. In a folding lens hood for cameras, the combination with a base having a plurality of edges, of a series of shielding plates attached to the edges of the base plate, and means for attaching the base plate to a lens barrel including two series of lugs, one series being bent from the base plate and the other series remaining unbent, every alternate lug being bent at an angle to an unbent lug.

7. In a folding lens hood for cameras, the combination with a base having a plurality of edges, of a series of shielding plates attached to the edges of the base plate, and means for attaching the base plate to a lens barrel including two series of lugs made from the base plate and extending in an annular path, one series of lugs being arranged at substantially right angles to the other.

8. A folding lens hood for cameras including a base plate, a series of lugs on the base plate for supporting pintles, a series of shielding plates having lugs, said lugs engaging the pintles, springs normally tending to turn the shielding plates about the pintles, two shielding plates having flanges to overlie the edges of the other two shielding plates when the plates are in position to form the lens hood, one set of said flanges forming a latch for holding the shielding plates in a folded position.

Signed at Rochester, New York, this 28th day of February, 1923.

JOHN CHRISTIE.